(12) United States Patent
Heertje et al.

(10) Patent No.: US 6,368,652 B1
(45) Date of Patent: *Apr. 9, 2002

(54) USE OF MESOMORPHIC PHASES IN FOOD PRODUCTS

(75) Inventors: Isaäc Heertje, Alphen; Henricus Arnoldus Hendrickx, Maassluis; Albertje Johanna Knoops, Capelle a/d IJssel; Elias Cornelis Royers, Rotterdam; Hessel Turksma, Delft, all of (NL)

(73) Assignee: Van den Bergh Foods Co., division of Conopco, Inc., Lisle, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/479,477

(22) Filed: Jun. 7, 1995

Related U.S. Application Data

(63) Continuation of application No. 08/064,125, filed as application No. PCT/EP91/02143 on Nov. 12, 1991.

(30) Foreign Application Priority Data

Nov. 23, 1990 (EP) ............................................. 90203100
Mar. 7, 1991 (EP) ............................................. 91200487

(51) Int. Cl.[7] ............................................. A23D 7/015

(52) U.S. Cl. ........................ 426/601; 426/602; 426/604

(58) Field of Search ................................ 426/601, 602, 426/604

(56) References Cited

U.S. PATENT DOCUMENTS

| | | |
|---|---|---|
| 3,026,207 A | 3/1962 | Murray |
| 3,180,736 A | 4/1965 | Landfried |
| 3,216,829 A | 11/1965 | Hansen |
| 3,282,705 A | 11/1966 | Hansen |
| 3,379,535 A | 4/1968 | Landfried et al. |
| 3,502,482 A | 3/1970 | Birnbaum |
| 3,592,660 A | 7/1971 | Neu |
| 3,673,106 A | 6/1972 | Jones et al. |
| 3,800,036 A | * 3/1974 | Gabby et al. ............... 426/567 |
| 3,809,764 A | * 5/1974 | Gabby et al. ............... 426/607 |
| 3,949,102 A | * 4/1976 | Hellyer et al. .............. 426/567 |
| 4,226,890 A | 10/1980 | Howard |
| 4,770,892 A | 9/1988 | Grealy et al. |
| 4,788,075 A | 11/1988 | Joseph et al. |
| 4,873,094 A | 10/1989 | Pischke et al. |

(List continued on next page.)

FOREIGN PATENT DOCUMENTS

| | | |
|---|---|---|
| CA | 1180250 | * 1/1985 |
| DE | 2935572 | 3/1981 |
| EP | 63468 | 10/1982 |
| EP | 98664 | 1/1984 |
| EP | 268974 | 6/1988 |
| EP | 279498 | 8/1988 |
| EP | 454366 | 10/1991 |
| GB | 1501106 | 2/1978 |
| WO | WO 91/00016 | 1/1991 |
| WO | WO 92/09209 | 6/1992 |

OTHER PUBLICATIONS

"Distilled Monoglycerides", Food Engineering 1962 pp. 97–100.*
*Enclopedia of Food Science Food Technology and Nutrition*, vol. 6, "Tecture", pH–Soya Milk, p. 4059 (Exhibit 1, D7).
Declaration of Kçre Larsson, (Exhibit 2,D8).
Minutes of the Oral Proceedings of Apr. 2, 1996.
Tranmission of the New Certificate for a European Patent Pursuant to Route 62a EPC.
Decision to Maintain the European Patent in Amended Form (Article 102(3) EPC).
Interloctory Decision in Opposition Proceedings (Article 106(3) EPC).
Letter of Jan. 7, 1997 regarding Opposition against EP 0 558 523 in the name of unilever PLC; Ref. 6575 EP1.
Notice of Opposition against EP 91919493.6.
Communication of a Notice of Opposition dated May 8, 1995.
Annex 1.
Gunstone, Harwood and Padley, "The Lipid Handbook" (Chapman & Hall, 1986) pp. 226–235.
Birnbaum, "Surfactants and Shortenings in Cake Mixing," *The Baker's Digest*, Feb. 1978, pp. 29–38.
Buddemeyer et al., "The Role of Stearyl–2 Lactic Acid in Chemically Leavened Baker Products," *The Baker's Digest*, Aug. 1961, pp. 54–57.
Lutton, "Phase Behavior of Aqueous Systems of Monoglycerides," J.A.O.C.S. 42, pp. 1068–1070.
Krog et al., "Food Emulsifiers and Their Associations with Water," pp. 67–139.
K.Larsson, "Some Effects of Lipids on the Structure of Foods," *Food Microstructure*, vol. 1 (1982) pp. 55–62.
Krog et al., "Swelling Behavior of Lamellar Phases of Saturated Monoglycerides in Aqueous Systems," J. Sci. Fd. Agric., 1973, 24, 691–701.
Krog, "Theoretical Aspects of Surfactants in Relation to Their Use in Bread Making," *Cereal Chemistry*, 58(3):158–164.
"Water Relations of Foods," edited by R. B. Duckworth (Academic Press, 1975) pp. 604–605.

(List continued on next page.)

*Primary Examiner*—Carolyn Paden
(74) *Attorney, Agent, or Firm*—Gerard J. McGowan, Jr.

(57) ABSTRACT

Mesomorphic phases of edible surfactants can advantageously be added to food products to provide for example structuring or fat-replacement. Preferably the mesomorphic phases are present as bulk phases in finished or ready to eat food products.

30 Claims, No Drawings

U.S. PATENT DOCUMENTS

| | | |
|---|---|---|
| 4,877,625 A | 10/1989 | Dieu et al. |
| 5,080,921 A | 1/1992 | Reimer |
| 5,082,684 A | 1/1992 | Fung |
| 5,106,644 A | 4/1992 | El-Nokaly |
| 5,120,561 A | 6/1992 | Silva et al. |
| 5,139,803 A | 8/1992 | Haynes et al. |
| 5,158,798 A | 10/1992 | Fung et al. |
| 5,308,639 A | 5/1994 | Fung |
| 5,620,734 A * | 4/1997 | Wesdorp .................. 426/601 |
| 5,652,011 A * | 7/1997 | Heertje .................. 426/601 |

OTHER PUBLICATIONS

"Microemulsions and Emulsions in Foods," El–Nokaly, ed. (American Chemical Society, 1991) pp. 46–50.

Bailey's Industrial Oil and Fat Products, vol. 3; Chrysam et al., (1985) pp. 73 & 119.

* cited by examiner

USE OF MESOMORPHIC PHASES IN FOOD PRODUCTS

This application is the continuation of U.S. Application 08/064,125 filed May 24, 1993, now abandoned, which was the National stage of International Application No. PCT/EP91/02143, filed Nov. 12, 1991.

BACKGROUND OF THE INVENTION

The present invention relates to the use of mesomorphic phases of edible surfactants, in the first place for the structuring of foodstuff and to finished or ready to eat surfactants containing said mesomorphic phases.

According to the general prior art the structuring of foodstuffs can be accomplished in various ways. Two main routes can be distinguished:
(1) the structuring by biopolymers such as proteins and carbohydrates, and
(2) the structuring by "particles" in the widest sense.

In the former case polymeric molecules cross-link to form a tangled, interconnected molecular network in water. In those systems the presence of junction zones or entanglements leads to gel formation and the enclosure of water. Examples of those polymeric substances are starch in puddings, gelatin in desserts and in the water phase of fat spreads, pectin in jams, carrageenin in desserts and in the water phase of fat spreads, and many others.

In the second case entities such as air cells, water droplets, fat droplets, crystals, starch granules or casein micelles are dispersed into the food system. Interaction forces between such particles determine the consistency and the physical stability of the food products. Many food systems fall into this category. In yoghurt aggregated protein particles form a network of protein strands. In mayonnaise an "interconnected" structure of oil droplets is responsible for its consistency. In a shortening fat crystals form an interconnected network structure enclosing oil. In a margarine water droplets are dispersed into a continuous network structure of fat crystals and oil. So, this represents a dispersion of particles in a network of particles. Even more complicated structures are found in butter and ice cream. But in all those cases a build-up of structure from particles of particle networks can be distinguished, which is responsible for the consistency of the finished products.

The present invention provides a new way of structuring food products. The formation of mesomorphic phases of edible surfactant molecules and water can give rise to a firm texture and consistency. The use of this property of mesomorphic phases, to give consistency to products, is new to the food business. However, it should be noted that this use may already be known in other areas such as cosmetics and pharmaceuticals.

This new way of product structuring may be described e.g. as a regular, molecular arrangement of surfactant molecules with intervening aqueous regions. For the purpose of the invention the term mesomorphic phase is intended to include all semi-ordered phases of water and edible surfactant materials. Examples of mesomorphic phases are cubic, hexagonal, alpha crystalline gel, beta-crystalline coagel and lamellar phases. Preferred mesomorphic phases for use in accordance with the invention are lyotropic phases; also preferred are lamellar phases. For the purpose of the present invention, the term lamellar phase refers to any system having a pattern of alternating bilayers of edible surfactants and water. Examples of lamellar phases are lamellar droplet phases, lamellar gel phases and lamellar phases containing extended parallel layers of surfactants and water.

In the lamellar phase surfactants, are believed to form a bilayer structure. It is believed that a bulk lamellar phase consists of stacks of bi-layer structures with an intervening aqueous phase. Products according to the present invention preferably comprise bulk regions of the lamellar phase whereas it has been suggested that known products of the prior art might contain boundary layers of this phase at interfaces, such as those found around oil-droplets in water-continuous fatty products.

The bulk lamellar phase may be formed by temperature cycling of a mixture of surfactant and water. In the crystalline state, the surfactant molecules are oriented with adjacent hydrophillic groups and the hydrophobic chains are parallel and densely packed. On contact with water and heating to the so-called 'Krafft' temperature it is believed that water penetrates between the adjacent 'head' groups to form a 'liquid crystal' structure. On cooling below the 'Krafft' temperature, the hydrophobic chains pack into a regular lattice, producing a one-dimensionally periodic 'sandwich' structure of alternating surfactant and aqueous layers.

As an example of the 'gel' structure obtained: for a mixture of water and a distilled monoglyceride made from fully hydrogenated lard, which has been cycled above the Krafft temperature, X-ray diffraction in the low-angle region reveals that the thickness of the monoglyceride layers is of the order of 50–60 Angstrom. As the proportion of water in the mixture in the system is increased the inter-planar spacing increases, as water is taken up between the monoglyceride layers. It will be realised that the fine structure of the mesomorphic phase, especially as regards the inter-planar spacing, will vary when different surfactants are used.

Another preferred mesomorphic phase according to the invention is a beta-crystalline coagel, which is believed to consist of small plate-like crystals having a an average thickness of less than 1 $\mu$m or even less than 0.1 $\mu$m, said platelets being dispersed in an aqueous environment. This is a suspension of beta-crystalline emulsifier in water and is also known as a 'hydrate'. These coagels may be formed instead of an alpha crystalline gel phase under certain conditions, such as at acid pH. Both the above mentioned alpha gels and these hydrates are used extensively in the baking industry as crumb softening agents in wheat bread and as cake volume improvers, but it is believed that the structure of the mesomorphic phase is lost during product preparation and consequently that the finished foodstuff (be it bread or cake) does not contain bulk mesomorphic phase. In the context of the invention the coagel phase is considered a semi-ordered phase of water and edible surfactant (mesomorphic phase).

The presence of mesomorphic phases in food products may be detected by any method suitable for the detection of regular arrangements of surfactant materials. Suitable methods include for example NMR, Electron microscopy, Differential scanning calorimetry, light microscopy and X-ray diffraction.

Consequently, the present invention relates in the first place to the use of mesomorphic phases of edible surfactants as structuring agent. This structuring leads to many other useful applications, such as the use as fat replacer, foaming agent, egg white replacer, preservative, lubricating agent, consistency control agent, moisture retention agent and/or flavour release agent in foodstuff. In another aspect the invention relates to a finished foodstuff containing a mesomorphic phase of edible surfactant and less than 80% by weight of edible oil.

With respect to the use as fat replacer it should be noted that the present invention can provide edible compositions which have a reduced calorific contents as compared to normal foodstuffs. The present invention allows for the possibility of preparing foodstuffs with fat-like properties, but with the use according to the present invention containing essentially no fat at all or a very low amount of e.g. less than 5 wt. %.

In recent years there have been several developments regarding so-called "fat replacers". Such materials are intended to have as far as practical the functional and sensorial properties of fats, but to have a reduced calorie content and, where possible, health benefits as compared to fats. Much effort has been spent in the development of new materials which have a fatty functionality but are poorly adsorbed or non-digestible in the human gut.

Amongst such "fat replacer" materials are the sugar fatty acid esters, originally used as lubricants but now proposed for use in foods. The use of these sugar fatty acid esters as fat substitutes in margarines is suggested in EP-A-020 421 (Orphanos et al.: to the Procter & Gamble Company). Such margarines have a "fat-ty" phase which comprises one or more triglyceride fats and one or more fat-replacers mixed intimately or in mutual solution. Food products are also envisaged which contain no triglyceride but have a "fat" phase consisting essentially of one or more fat replacers. Further reference to edible fat replacers can be found in U.S. Pat. NoS. 4,005,195 and 4,005,196 and EP-A-223856, 236288 and 235836.

Other glyceride related lubricants, especially the so-called hindered polyols having no hydrogen at the beta-carbon, such as the pentaerythritols and related compounds have been proposed as fat replacers (see e.g. U.S. Pat. No. 4,927,659 to Nabisco Brands Inc.).

Fat replacers comprising proteinaceous materials have been described. However, it should be understood that because these materials are digestible, they do not have as marked a calorie reducing effect as the above mentioned fat replacers.

Few of these materials, such as the sucrose esters or hindered polyols have completely understood physiological effects. It is generally believed that further experimental work will be required before the physiological effects are fully determined. There remains a clear need for fat replacers which comprise materials of well-understood physiological effect.

SUMMARY OF THE INVENTION

It was now found that the mesomorphic phase of edible surfactants can be used as a fat-replacing food component with a fat-like functionality and a simple composition. The invention provides products having a fatty oral impression and a plastic rheology.

DETAILED DESCRIPTION OF THE INVENTION

Their use as foaming agent stems from the capability of the mesomorphic phase to stabilize air cells. It leads to very stable foam structure with air cells surrounded by a continuous structure of mesomorphic phase. This allows for its use in all products where air stabilization is essential, such as low fat substitutes for whipped creams, ice-cream and creaming margarines.

Their use as egg white replacer results from the excellent foaming capability mentioned above. This allows for its use in all products where raw egg white is used for foaming, such as bavarois type of products and toppings. This is very important in view of the danger of salmonella infection of raw egg white.

Their use as preservative is ascribed to the enhanced microbial stability, caused by the limited size of the intervening water areas in mesomorphic phase systems, which hinders the outgrowth of microorganisms. For example, the size(spacing) of the intervening water layers in a mesomorphic phase which is a lamellar phase system containing 95% water is approximately 0.1 $\mu$m, which is far below the size (1 $\mu$m approx.) of the effective microorganisms.

Their use as lubricant is connected with the fatty functionality and the proper rheology of these materials, even at a high water content. Two aspects are considered to be important in this respect: the hydrophobicity of the aliphatic chains of the applied surfactant molecules and the induced flow properties; e.g. in case of the mesomorphic lamellar phase structure the bilayers of surfactant molecules are separated by layers of water and are thus free to slide in relation to each other with the water as the gliding plane.

Their use as consistency control agent is directly connected with the structuring capability. The desired rheological properties can be achieved by proper choice of experimental parameters, such as concentration of non-ionic- and ionic surfactant, shear, pH and electrolyte. An example of such an application is in the design of spoonable and pourable products.

Their use as moisture retention agent is connected with the enclosure of the water between aggregated surfactant molecules. The physical state of water in foods influence the physical, chemical and functional characteristics of foods and food components, by influencing the water transport and/or the water mobility and/or the water activity. The present invention allows the introduction of large amounts of "immobilized" water, which can be freed at a later stage.

Their use as flavour release agent is connected with the possibility to entrap flavours in the water phase c.q. the surfactant phase of the mesomorphic phase. The nature of the systems would lead to a controlled release of the applied flavours. Many controlled release delivery systems have been described in the literature, e.g. the use of liposomes. Those systems have to be prepared separately and have to be added to the foodstuff as an extra and only in a limited amount. The present invention allows the addition of flavour to the food system as such with proper retention of flavour components.

The mesomorphic phase and its method of preparation is known to food scientists. In the "Lipid Handbook" of Gunstone, Harwood and Padley (Chapman and Hall, 1986) such phases are mentioned at page 227. Further detail may be found in "Food emulsions" of S. Friberg (Marcel Decker, 1976 at page 82).

Such mesomorphic phases may advantageously be formed by heating a mixture containing the edible surfactant and water to a temperature above the Krafft temperature, followed by cooling.

It should be noted further that the above mentioned Lipid Handbook mentions at page 227 the use of mesomorphic phases of saturated, distilled monoglycerides as additives for processed potatoes or cake emulsions. However, this application is used for aerating bakery batters and enhanced complexing with amylose in non-finished starch based products. In the former application the aerating effect is ascribed to the better distribution of the monoglycerides in the batter system and in the latter application the monoglycerides form insoluble complexes with amylose, responsible for the crumb softening effect in bread and the texture improving effects on potato products and pasta foods. The emulsifiers are added to the bakery products before baking and to the potato products before final processing and consequently there is no mesomorphic phase in the finished products. The use of mesomorphic phases in such preparation methods for cake batters and processed potatoes are not embraced within the scope of the present invention.

In a preferred embodiment of the invention the mesomorphic phase is a lamellar gel phase. These phases are particularly preferred, because they can include a sensational amount of water, e.g. 98 or even 99 wt. %, based on the mesomorphic phase of edible surfactant and water.

Another preferred element of the present invention is the presence of bulk regions of mesomorphic phases in food products. Most preferred is the presence of bulk regions of mesomorphic lamellar phases. Bulk phases preferably consist of either a more or less continuous mesomorphic phase or of discrete particles of mesomorphic phase, for example having a number average particle size of between 1 μm and 1,000 μm. In this respect it should be noted that it has been suggested that known products of the prior art might contain non-bulk boundary layers of the lamellar phase at o/w interfaces, such as those found around oil droplets in water-continuous fatty products. The bulk regions of mesomorphic phase of edible surfactants may advantageously be used for replacing the aqueous phase and/or oil phase in food products in accordance to the invention.

Preferably food products in accordance to the invention contain at least 5% by volume of mesomorphic phase of edible surfactant, more preferred 10–100% by volume, for example 20–80% by volume, whereby the volume of the mesomorphic phase refers to the volume of the combined water/edible surfactant system.

According to the present invention any edible surfactant may be used although lipidic substances are preferred. However, the use of other, non lipidic surfactants, for example surfactant or amphiphylic carbohydrates is not excluded. In general the preferred edible surfactants are selected from the group consisting of nonionic surfactants, anionic surfactants and cationic surfactants.

Preferred non-ionic surfactants are edible monoglycerides, diglycerides, poly-glycerol esters, non-ionic phospholipids, non-fatty carboxylic acid esters of fatty acid esters, partial sugar-fatty acid esters and, partial fatty acid esters of polyols and mixtures thereof.

Preferred cationic surfactants are cationic phospholipids, cationic non-fatty carboxylic acid esters of fatty acid esters and mixtures thereof.

Preferred anionic surfactants are lactylated fatty acid salts, anionic phospholipids, anionic non-fatty carboxylic acid esters of fatty acid esters and their metal salts, fatty acids and their metal salts and mixtures thereof.

The fatty acid chains used in these surfactants can be of any type and origin. Preferably, however $C_{8-28}$ fatty acid chains are present, more preferred $C_{12-22}$, for example $C_{14-18}$. The fatty acids may for example be saturated, unsaturated, fractionated or hydrogenated and be derived from natural (for example dairy, vegetable or animal) source or synthetic sources.

In another aspect the present invention relates to a finished foodstuff containing a mesomorphic phase of edible surfactant. For the purpose of the present invention, finished foodstuffs are food-products which are intended to be eaten without significant further processing. Excluded by this term are batters, doughs etc. Included are spreads, dressings, cheese, whippable products, ice-cream etc. Finished food products are generally marketed while packed in containers having a content of from 5 to 5,000 grams, more general 50 to 1,000 grams.

While foodstuffs according to the present invention can comprise a mesomorphic phase comprising 99–5 wt. % of water, it is preferred that the mesomorphic phase comprises 98–60 wt. % and in particular 97–80 wt. % of water, the percentages being based on the total weight of the mesomorphic phase. The total water level of products of the invention may for example be up to 99%, for example 10–90%, conveniently 20–80%.

Preferably the total level of edible surfactants in food products of the invention is from 0.1 to 30%, more preferred 1–15%, most preferred 2–10% by weight of the foodstuff.

Typical embodiments of the invention as illustrated hereafter by example comprise as the mesomorphic phase, in particular the bulk mesomorphic phase a combination of a major amount of a non-ionic surfactant and a minor amount of an ionic co-surfactant. Preferably, the mesomorphic phase comprises 1–30%, more preferred 2–10 wt. % of non-ionic surfactant for example monoglycerides and 0.005–10% more preferred 0.01–1 wt. % of ionic co-surfactant for example an alkali metal salt of a lactylated fatty acid, preferably sodium stearoyl lactylate the percentages being based on the total weight of the mesomorphic phase.

The presence of "non-ionic", "cationic" and "anionic" surfactants is of course dependent on the pH-value of the foodstuff in which the surfactants are used. In this respect it should be noted that normally the pH for foodstuffs is between 3–8, for dairy products the pH-value is in the range of 4–7.

The combination of non-ionic and ionic surfactants is preferred because the ionic surfactants are believed to give rise to an electrical charge at the interface of the mesomorphic structure used according to the present invention. The mutual repulsion at the interface of surfactant and water in the mesomorphic phase, for example the lipid bi-layers in a mesomorphic lamellar structure, creates a layer structure in which a surprisingly large amount of water can be incorporated. This phenomenon allows for the use as edible fat replacer and water retention agent as attractive applications.

Preferably the nonionic surfactant and the ionic surfactant are used in weight ratios of from 100:1 to 1:10, more preferred 50:1 to 1:1, for example 40:1 to 10:1.

Preferred non-ionic surfactants are monoglycerides, lactylated esters of monoglycerides and phospholipids. Preferred ionic co-surfactants are alkali-metal salts of lactylated fatty acids, e.g. sodium stearoyl lactylate (SSL), citric acid esters, ionic phospholipids (phosphatidic acid (PA), succinated esters and diacetyl tartaric acid ester of monoglyceride (DATEM).

Especially in the presence of the alkali metal salt of a lactylated fatty acid, a monoglyceride-based mesomorphic system can take up a large quantity of water into the inter-planar water layers, and this 'swelling' of the emulsion improves suitability of the products as edible fat replacers. While the invention will be illustrated hereafter by reference to examples in which the surfactant system comprises both monoglyceride and SSL, the use of other, single surfactants or preferably combinations of two or more surfactants to obtain a swellable mesomorphic system is not hereby excluded.

While foodstuffs according to the invention generally will comprise less than 80% by weight of fat, the preferred level of this ingredient is 0–79 wt. % fat, for example 0 to 40%, preferably 1–30%. In some products a low fat content may be required as a flavour carrier.

Surprisingly it has also been found that the mesomorphic phase, which is used according to the invention; can be used in foodstuffs containing electrolyte, without affecting the structuring capability of the system. One example of electrolytes that may be incorporated is sodium chloride. The amount of electrolytes such as salt in foodstuffs according to the invention preferably ranges from about 0.01–5 wt. %, more preferred 0.1 to 3%, for example 0.2 to 2% based on the total weight of the finished food product.

The mesomorphic phases of edible surfactants, which are used according to the present invention, can be used in foodstuffs containing a bio-polymer such as carbohydrates e.g. pectins, starches and carrageenan, or proteins. Suitable materials are for example milk protein, gelatin, soy protein, xanthan gum, locust bean gum, hydrolysed starches (for example PaselliSA2 and N-oil), microcrystalline cellulose. Especially preferred is the use of these biopolymer materials in spreads according to the invention.

The amount of biopolymer in compositions of the invention is dependant on the desired degree of gelling and the presence of other ingredients in the composition. Usually the amount of gelling agent lies between 0 and 30%, mostly between 0.1 and 25% based on the weight of the aqueous phase of the product. If hydrolysed starches are present their level is preferably from 5–20%; other gelling agents are generally used at levels of up to 10%, mostly 1–7%, most preferred 2–5% all percentages being based on the weight of the aqueous phase. Particularly preferred are combination of say 5–15% hydrolysed starch and 0.5–5% of other gelling materials. Preferably the other gelling material includes gelatin.

It is preferable that fat and mesophase containing foodstuffs should comprise less than 10% saturated fat or equivalent thereof on product and/or less than 10% trans fat or equivalent thereof on product. Embodiments of the invention include sunflower oil based spreads which contain no added 'hardstock' components. These 'hardstock' components include saturated fats and trans fats of which the overall dietary intake should be reduced.

Examples of foodstuffs in which the mesomorphic phases of edible surfactants may be used, are spreads, in particular zero- or extremely low fat spreads (which contain less than about 20% of fat), dressings, i.e. spoonable or pourable dressings e.g. dressings of the mayonnaise-type, dairy and non-dairy creams, toppings, processed cheese, semi-hard cheese, sauces, sweet spread, pastry-margarines, whippable products, sauces, liquid dairy products and ice cream.

For preparing food-products containing the mesomorphic phase in accordance to the invention, it is possible to prepare the mesomorphic phase separately and add this phase as an ingredient to the other ingredients of the product, or it is possible to prepare the mesomorphic phase "in-situ" in the presence of one or more other ingredients of the composition. In any case, however, the preparation of the mesomorphic phase preferably takes place while heating to a temperature above the Krafft temperature, followed by cooling. Generally these temperatures are from 0–100° C., more general 30–90° C., most general 40–70° C. Any heat-sensitive ingredients or ingredients which could prevent the formation of a mesomorphic phase are preferably added after cooling.

The invention will be further illustrated by means of a number of specific embodiments: it will be evident that the scope of the invention is not limited to these specific embodiments.

I Dressings or Mayonnaise

A first embodiment of the present invention relates to dressings containing a mesomorphic phase of edible surfactants. Suitable uses are as structuring agent, fat replacer, egg replacer, preservative, lubricating agent, consistency control agent, moisture retention agent and flavour release agent. Especially preferred is their use in dressings as a fat replacer, egg replacer and consistency control agent.

Generally dressings or mayonnaise are oil in water emulsions. The oil phase of the emulsion generally is 0 to 80% by weight of the product. For non-fat reduced products the level of triglycerides is generally from 60–80%, more preferred from 65–75% by weight. For salad dressings the level of fat is generally from 10–60%, more preferred from 15 to 40%. Low or no-fat containing dressings may for example contain triglyceride levels of 0, 5, 10 or 15% by weight.

Other fatty materials such as for example polyol fatty acids ester may be used as a replacement for part or all of the triglyceride materials.

The level of edible surfactant material in the dressing will generally be from 0.1 to 15%, more preferred from 1–10%, most preferred from 2 to 8% by weight. Preferably the level of nonionic edible surfactant is from 0.1 to 15%, more preferred, 0.5–10%, most preferred 1 to 8% by weight. Especially preferred are monoglycerides as nonionic edible surfactants. Preferably the level of ionic edible surfactant is form 0 to 5%, more preferred 0.05 to 2%, most preferred 0.1 to 0.5% by weight.

Dressings are in general low pH products with a preferred pH of from 2–6, more preferred 3–5, for example about 3.5. The use of ionic surfactants is at these pH values is limited to a number of compounds, because proper functioning of the ionic surfactant requires that the surfactant molecule is at least partly dissociated at the indicated pH. For the use in dressings the preferred anionic is the diacetyl tartaric ester of monoglycerides (In the examples Admul DATEM 1935 ex. Quest Int. has been used). Also an anionic phospholipid such as phophatidic acid can be applied.

In addition to the above mentioned ingredients dressings in accordance to the present invention optionally may contain one or more of other ingredients which may suitably be incorporated into dressings and/or mayonnaise. Examples of these materials are emulsifiers, for example egg-yolk or derivatives thereof, stabilisers, acidifiers, biopolymers, for example hydrolysed starches and/or gums or gelatin, bulking agents, flavours, colouring agents etc. The balance or the composition is water, which could advantageously be incorporated at levels of from 0.1–99.9%, more preferred 20–99%, most preferred 50 to 98% by weight.

The mesomorphic phase of edible surfactant in the mayonnaise of dressing may either be prepared separately before adding the other ingredients of the composition, or may be formed "in-situ", in the presence of other ingredients. As described above, an important aspect of the formation of a mesomorphic phase of edible surfactants is the heating of the edible surfactant and water to a temperature above the Krafft temperature of the surfactant. Hence it is preferred that any ingredients of the dressing or mayonnaise that would not be resistant to these elevated temperatures and/or could prevent the formation of the mesomorphic phase, are added after the mesomorphic phase of edible surfactant has been formed. A preferred process for the preparation of dressings and mayonnaise therefore comprises the following steps:

(a) heating a mixture containing water, edible surfactant and optionally other ingredients to a temperature above the Krafft temperature of the edible surfactant;

(b) cooling the mesomorphic phase and adding the remaining ingredients of the composition.

During this process it is generally preferred that at some stage the ingredients are mixed under such conditions that the required structure can be formed. Such a mixing can usually take place under moderate shear.

II Spreads

Another preferred embodiment of the invention is the use of mesomorphic phases of edible surfactants, as generally specified in the above, in spreads. Suitable uses are as structuring agent, fat replacer, egg replacer, preservative, lubricating agent, consistency control agent, moisture retention agent and flavour release agent. Especially preferred is their use in spreads as a fat replacer, flavour release agent, consistency control agent or preservative.

Spreads according to the embodiment generally contain from less than 80% by weight of edible triglyceride materials. Suitable edible triglyceride materials are for example disclosed Bailey's Industrial Oil and Fat Products, 1979. In spreads of non-reduced fat content (margarines), the level of triglyceride material will generally be more than 60% and less than 80%, preferably from 70 to 79% by weight. In spreads of reduced fat content the level of triglycerides will generally be from 30–60%, more general from 35 to 45% by weight. In very low fat spreads the level of triglycerides will generally be from 0–40%, for example 30%, 25%, 20% or even 10% or about 0%. Other fatty materials, for example sucrose fatty acid polyesters may be used as a replacement for part or all of the triglyceride material.

The edible surfactant material for use in spreads is preferably used at a level of from 0.1 to 15%, more preferred from 1–10%, most preferred from 2 to 8% by weight. Preferably the level of nonionic edible surfactant is from 0.1 to 15%, most preferred, 1–10%, most preferred, 2 to 8% by weight. Especially preferred are monoglycerides and lecithins as nonionic edible surfactants. Preferably the level of ionic edible surfactant is form 0 to 5%, more preferred 0.05 to 2%, most preferred 0.1 to 0.5%. Preferred ionic edible surfactants are lactylated fatty acid salts and phophatidic acid.

In addition to the above mentioned ingredients, spreads in accordance to the invention may optionally contain further ingredients suitable for use in spreads. Examples of these materials are gelling agents, sugar or other sweetener materials, EDTA, spices, salt, bulking agents, flavouring materials, colouring materials, proteins, acids etc. Particularly preferred is the incorporation of biopolymers in spreads. Suitable biopolymer materials are for example milk protein, gelatin, soy protein, xanthan gum, locust bean gum, hydrolysed starches (for example PaselliSA2 and N-oil), and microcrystalline cellulose.

The amount of biopolymer in spreads of the invention is dependant on the desired degree of gelling and the presence of other ingredients in the composition. Usually the amount of gelling agent lies between 0 and 30%, mostly between 0.1 and 25% based on the weight of the aqueous phase of the spread. If hydrolyzed starches are present their level is preferably from 5–20%; other gelling agents are generally used at levels of up to 10%, mostly 1–7%, most preferred 2–5% all percentages being based on the weight of the aqueous phase. Particularly preferred are combination of say 5–15% hydrolysed starch and 0.5–5% of other gelling materials. Preferably the other gelling material includes gelatin.

The balance of the composition is generally water, which may be incorporated at levels of up to 99.9% by weight, more general from 10 to 98%, preferably from 20 to 97% by weight. Spreads according to the invention may be fat and/or water continuous.

The mesomorphic phase can be used as a partial or entire replacement for the water phase and/or oil phase in the spread products.

In the preparation of spreads in accordance to the invention, the mesomorphic phase may either prepared before the addition of other ingredients, or the mesomorphic phase may be prepared "in-situ" while other ingredients of the composition are present. In any case however, the formation of the mesomorphic phase, preferably involves the heating of the edible surfactants and water to a temperature above the Krafft temperature, therefore heat-sensitive ingredients or ingredients which could prevent the formation of mesomorphic phase, should preferably be added after the formation of the mesomorphic phase.

In general the method for preparing spreads according to the invention involves the mixing of the edible surfactants (preferably a mixture of a non-ionic surfactant and a co-surfactant) and water to a temperature just above the Krafft-temperature of the system. Other ingredients, e.g. salt, colouring agents and flavouring ingredients can also be added. The pH can be set to the desired value using e.g. sodium hydroxide or lactic acid. This mixture is then stirred gently until the components are distributed homogeneously. Subsequently the formed mesomorphic phase is cooled down, generally while applying shear. This results in a low calorie plastic spreadlike gel phase with oral properties similar to high- and reduced fat spreads. The fat ingredient of the spread, if any, is preferably added after cooling and mixed into the product under stirring to effect the desired structure formation. Sweet spreads may be prepared accordingly.

III Whippable Products Such as Creams

Another preferred embodiment of the invention is the use of mesomorphic phases of edible surfactants in whippable products, in particular whippable non-dairy creams, mousses, bavarois, etc. Preferred uses are as foam control agent and fat replacer.

Preferably the level of edible surfactant in whippable dairy products is from 0.1 to 30% by weight, more preferred 1 to 20%, most preferred 2 to 15% by weight of the composition. Preferably the edible surfactant material comprises nonionic surfactants such as monoglycerides, for example at levels of 0.1 to 30%, more preferred 1 to 20%, most preferred 2–15% by weight. In addition to the monoglyceride co-surfactants may be present, for example at a level of 0 to 10%, more preferred 0.1 to 8%. A preferred cosurfactant is lecithin.

In addition to the edible surfactant materials in the mesomorphic phase, whippable products in accordance to the invention may advantageously contain one other ingredients, for example proteins, sugar, emulsifiers, colorants, flavouring agents, fat (preferably vegetable fat), skimmed milk ingredients, biopolymers etc. For example the fat level may be less than 80%, more preferred 0–40%, for example about 5%, 15% or 30%. The balance of the composition is preferably water.

As described above the mesomorphic phase of edible surfactants may be prepared before mixing the remaining ingredients or may be formed in-situ in the presence of one or more other ingredients of the composition. In any case, however, the formation of the mesomorphic phase preferably takes place while heating above the Krafft temperature of the system, followed by cooling. Heat sensitive ingredients or ingredients which could hamper the formation of a mesomorphic phase are hence preferably added after formation of the mesomorphic phase.

A convenient process for the preparation of a whippable product in accordance to the invention involves therefore the heating of the edible surfactant and the water to a temperature above the Krafft temperature under gentle stirring followed by cooling and adding the remaining ingredients. Excessive stirring should sometimes be avoided after cooling, to prevent undesired air incorporation in the product in unwhipped state.

IV Ice Cream or Other Frozen Desserts

A further advantageous embodiment of the present invention relates to the use of mesomorphic phases of edible surfactants in frozen desserts. Suitable uses are as structuring agent, fat replacer, preservative, lubricating agent, consistency control agent, foaming agent, moisture retention agent and flavour release agent. Especially preferred is their use in frozen desserts of ice cream as a structuring agent, foaming agent, fat replacer or for improving melt-down properties.

Problems often encountered while using conventional fat-replacers in frozen desserts are off-flavours and difficulties in suitably controlling the structure and eating characteristics. It has been found that while using the mesomorphic phases of edible surfactants, frozen desserts can be obtained having the structure and sensoric properties of ice cream but a lesser caloric content. Also fat-free ice-cream like products can be obtained. Furthermore the use of mesomorphic phases of edible surfactants can provide frozen desserts having improved melt-down properties.

Although by using the mesomorphic phase concept an ice-cream impression can be achieved without any fat, it may be for some flavours be convenient to use a relative small amount of fat (e.h. up to 2 to 3% by weight, preferably 0.5 to 1% by weight) for improving the flavour release. Needless to say that the calorific content increases by this addition.

Preferred frozen dessert compositions contain up to 10%, for example from 0.1 to 6% of edible surfactant, more preferred from 0.3 to 5%, most preferred from 0.5 to 2% by weight. Preferably the level of non-ionic edible surfactants is up to 10%, for example from 0.5 to 5%, more preferred from 0.6 to 3%, most preferred from 0.8 to 1.5% by weight. Most preferred is the use of monoglycerides as the nonionic edible surfactant. Preferably the level of ionic edible surfactants is from 0 to 1%, more preferred 0.05 to 0.5% by weight. Preferred ionic edible surfactants are lactylated fatty acids.

In addition to the mesomorphic phases of edible surfactants, frozen desserts of the present invention may contain all conventional ingredients suitable for incorporation therein. For example, frozen desserts according to the present invention will usually contain one or more ingredients for improving the sweetness thereof. Preferably sugar is used as the sweetening material. If sugar is used as sweetening agent, the level thereof is preferably from 5–40%, more preferred 10–20%. If other sweetener materials such as for example aspartame (trademark) are used, the level of these materials is chosen such that the sweetness of the product resembles that of a product having the above mentioned sugar contents. Use of artificial sweetener materials may further require the use of one or more bulking agents, for example hydrogenated starch materials.

Furthermore frozen desserts according to the invention preferably contain milk solids non fat (MSNF) at levels of 1–20%, more preferred 6–14% by weight. Additionally frozen desserts may advantageously contain low levels of emulsifier and/or stabilising agents, for example at a level of 0 to 0.5%, more preferred 0.2 to 0.4% by weight. Optionally further ingredients suitable for incorporation in frozen desserts may be used, for example fruit, flavours, colouring agents, chocolate, nuts, preservatives, biopolymers and freezing point depressants. Generally the balance of the composition will be water.

Suitable recipes resulting in improved melt-down properties are for example as follows:

0.5–5% monoglyceride, preferred 0.8–1.5%
0–1% ionic surfactant, preferred 0.05–0.5%
10–20% sugars,
6–14% milk solids non fat (msnf)
0–0.5% emulsifiers and stabiliser.

The balance being water and usual additives for frozen desserts. In these recipes, as usual, the sugars are contained both as sweeteners, freezing point depressants and as texturizing agents. As usual these purposes may be achieved by different means, e.g. using sucrose next to invert sugar, fructose, glucose, maltodextrin, corn syrups. A preferred sugar combination in the above recipes being 5–8% maltodextrin and 9–14% sucrose.

The same applies to the milk solids non fat: about one third thereof can be whey powder, so a suitable msnf combination in the above recipes is 6–8% msnf (including casein) and 1–3% whey powder.

Emulsifiers and stabilizers can be used as usual and examples thereof are widely known. Suitable amounts and products are exemplified in the examples. A preferred range for the total amount of these additives is from 0.2 to 0.4%.

Frozen desserts according to the invention may be prepared by any conventional method for the preparation of ice-cream and the like. For formation of the mesomorphic phase preferably the edible surfactant in the presence of water and optionally one or more further ingredients of the composition is heated to a temperature above the Krafft temperature of the mixture, followed by cooling down addition of the remaining ingredient and stirring under further cooling to obtain and aerated frozen dessert.

Conveniently the mesomorphic phase can be formed in-situ by mixing of the ingredients (preferably at an elevated temperature of 60–100° C., for example 70–95° C.), followed by the cooling down (to a temperature of 0–30° C. say about 5° C.) and homogenation, whereafter after an optional aging step (up to say 24 hours) the mixture is preferably whipped to have an overrun of between 50 and 300%, more preferred 75–200%, most preferred about 100%, while cooling in a usual continuous ice cream freezer to a low temperature (say 0–−20° C., more preferred −2 to −10° C., most preferred about −5° C.) and storage a temperature of say −10 to −30° C. Alternatively the mesomorphic phase can be prepared separately, and the other ingredients can be added to the phase afterwards. Whereafter the product is aerated and cooled.

V Cheese

Another preferred embodiment of the invention relates to the use of mesomorphic phases of edible surfactants in cheese products, for example processed cheese or semi-hard cheese. Preferred uses for the mesomorphic phase in cheese products are as structuring agent, fat replacer, lubricating agent, preservative, consistency improving agent and moisture retention agent.

Cheese products in general often contain dispersed droplets of fat dispersed in a matrix, which is often structured by casein. For the purpose of the present invention the mesomorphic phase may be used for replacing part or all of the dispersed phase, but also possible is that the mesomorphic phase is used as a replacement for all or part of the cheese matrix. In the former case, the mesomorphic phase will be present as a bulk phase consisting of discrete particles of the mesomorphic phase. In the latter case the mesomorphic phase may be a continuous bulk phase or may consist of discrete particles.

Preferably the level of edible surfactant in the cheese product will be from 0.1 to 15% by weight of the composition, more preferred 0.5 to 10%, most preferred 1 to 8%. Preferably the level of nonionic surfactant is from 0.1 to 15%, more preferred 0.5 to 10%. The level of ionic surfactants is preferably from 0 to 7%, more preferred 0.1 to 5%.

In addition to the mesomorphic phase of edible surfactant, cheese products of the invention may advantageously contain all types of ingredients which can be present in cheese, products. Examples of these ingredients are milk protein (preferably present at a level of 0–15%, more preferred 0.5 to 10%), fat (preferably present at levels from 0–45%, more preferred 1–30%); other fatty materials such as for example polyol fatty acid esters can replace all or part of the fat, electrolytes (for example $CaCl_2$ and/or NaCl at levels of 0 to 5%, more preferred 1–4%), rennet or rennin (for example at a level of 0.005 to 2%, more preferred 0.01–0.5%), flavours, colouring agents, emulsifiers, stabilisers, preservatives, pH adjusting agents, biopolymers etc. The balance of the product is generally water which may be present at levels of for example 0–99.5%, more preferred 5–80%, more preferred 30–75% by weight).

The cheese products according to the present invention range from soft cheeses to hard cheeses of various types such as semi hard cheeses (such as Gouda, Edam, Tilsit, Limburg. Lancashire etc), hard cheeses (for example Cheddar, Gruyere, Parmesan), external mould cheeses (e.g. Camembert and Brie), internal moulded cheeses (e.g. Roquefort, Gorgonzola etc), processed cheeses and soft cheeses (cottage cheese, cream cheese, Neufchatel etc.).

The cheese products of the invention may be prepared by any suitable process for the preparation of cheeses. Although this is dependant on the type of cheese, generally the following stages may be present: (1) mixing the ingredients at a suitable temperature, for example at 5–120° C.; (2) After cooling addition of a starter culture, cutting of the curd, moulding and eventual salting; and (3) ripening. As indicated above the mesomorphic phase of edible surfactants may be formed separately or may be formed "in-situ". If the mesomorphic phase is prepared separately, the phase thus formed is preferably added to the other ingredients in stage (1) as described above. If in-situ formation of the mesomorphic phase is used, this is preferably effected by addition of the edible surfactant to the mixture in stage 1, and ensuring that the temperature of the mix is elevated to above the Krafft temperature.

VI Other Food Products

Other food products in accordance with the invention which could advantageously contain a mesomorphic phase of edible surfactants, involve other edible emulsified systems, sauces, liquid and semi liquid dairy products, bakery cream, toppings etc.

The invention will be illustrated by means of the following examples:

All percentages in the examples are by weight of the composition unless indicated otherwise.

The following ingredients were used: The surfactants named Hymono and Admul followed by a code all are trade names of Quest International. The various types of β-carotene were obtained from Hoffmann-La Roche Ltd, Basel, Switzerland. BMP is butter milk powder. SMP is skimmed milk powder. Salt is sodium chloride. DATEM is Admul Datem 1935.

EXAMPLE A

Separate Preparation of Mesomorphic Phase

A mesomorphic phase of edible surfactant was made of the following ingredients:

| | |
|---|---|
| distilled water | 93.7% |
| monoglycerides (*) | 6.0% |
| Lactylated fatty acid (**) | 0.3% |

Notes:
*Hymono 1103 (ex quest Int.)
**Admul SSL 2004 (ex Quest Int)

The water was heated in a water-jacketed vessel until a temperature of 65° C. At that point all other ingredients were added to the water and the mixture was stirred gently, using a 'ribbon stirrer', for about 30 minutes. The pH of the product was set to a value of 4.6 using lactic acid. The product was cooled to ambient temperature.

The resulting product was a mesomorphic phase. The product could be used in the preparation of finished or ready to eat food products in accordance to the invention.

EXAMPLE B

Separate Preparation of Mesomorphic Phase

A mesomorphic phase was prepared with the following composition:

| | |
|---|---|
| Monoglyceride (*) | 7% |
| Sodium Stearoyl Lactylate (**) | 4% on mono. |
| Water | to 100% |
| Colour/Flavour | trace |

Notes
*= Hymono 1103
**= Admul SSL 2004

All ingredients were hand blended at 65° C. and the blend was neutralised with sodium hydroxide solution to pH 7.0. The resulting mixture was cooled to 10° C. The resulting product was believed to be a mesomorphic phase.

EXAMPLE C

Separate Preparation of Mesomorphic Phase

A mesomorphic phase was prepared with the following composition:

| | |
|---|---|
| Tap water | 92.3% |
| Monoglycerides | |
| saturated(Hymono 8903) | 4% |
| unsaturated (Hymono 7804) | 3% |
| Co-surfactant (Admul DATEM 1935) | 0.7% |

The water was heated until 55° C. on an electric heating plate equipped with a magnetic stirring facility. At 55° C. the surfactants were added to the water and mixed using the magnetic stirrer, until distributed homogeneously (about 75 minutes). Then the mesomorphic phase was slowly cooled down to room temperature under continuous stirring.

In this way a plastic gel phase was obtained which did not show phase separation upon storage or spreading. The gel pase gave a distinct fatty oral impression.

EXAMPLE D

Separate Preparation of Mesomorphic Phase

A bulk mesomorphic phase was prepared with the following composition:

| | |
|---|---|
| Hymono 1103 | 5% |
| SSL (Admul SSL 2004) | 4% on mono |
| water | balance |
| colour/flavour | trace |

The amount of SSl is equivalent to 0.2% by weight of the product. All ingredients were mixed together in a stirred water jacketed vessel at 65° C., and neutralised with sodium hydroxide to pH 7.0.

EXAMPLE I

Dressings and Mayonnaise

Example I.1

The mesomorphic phase of example B was hand-blended at ambient temperature with a commercially available mayonnaise (80% fat) in a weight ration of 1:1. The resulting reduced fat mayonnaise had acceptable organoleptic properties.

Example I.2

A low calorie pourable dressing was made using the following ingredients:

| | |
|---|---|
| gel phase | 33.5% |
| (mixture of 3.5% Monoglyceride (Hymono 8803) | |
| 0.14% Datem, the balance being water) | |
| water phase: | |
| water | 31% |
| sugar | 15% |
| salt | 1.4% |
| cider vinegar (5% acetic acid) | 13% |
| tomato paste | 3% |
| (ex Del Monte, double concentrated) | |
| flavours | 1.5% |
| biopolymeric thickeners | 0.5% |
| potassium sorbate | 0.1% |
| sun flower seed oil | 1% |

The gel phase and the water phase were prepared in separate streams. The gel phase was made by heating the gel phase ingredients to 65° C. in a water-jacketed vessel under gentle stirring for about 30 min. Subsequently the mesomorphic phase was cooled using a scraped surface heat exchanger (Votator, A-unit} to a temperature of 12° C. The A-unit was operated at a throughput of 2 kg/h and a rotor speed of 1150 rpm.

The water phase was made by dissolving the waterphase ingredients in a water-jacketed vessel under gentle stirring. The water phase with a throughput of 4 kg/h is combined with the gel phase just after its formation in the A-unit and introduced into a cooled pinned stirrer (C-unit), which was operated with a rotor speed of 700 rpm.

The final product, which had a pH of 3.5, had the properties of a pourable dressing. Consistency, mouthfeel and taste were comparable to a reference product containing 36% of oil and compared favourably with products, with 1% oil, containing biopolymeric thickeners only.

Example I.3

Under the same conditions as in example I.2, apart from the composition of the gel phase, a spoonable low calorie dressing was made. The composition of the gel phase was: 6% Hymono 8803, 0.24% DATEM and the balance water. This provided a thicker product, with all characteristics of a spoonable dressing. Its properties were comparable both to a commercial mayonnaise (80% fat) as well as to a reduced fat (35% fat) mayonnaise and compared favourably to products containing polymeric thickeners.

Example I.4

Under the same conditions as in example I.2, apart from the composition of the gel phase, a very thick dressing was made. The composition of the gel phase was: 10% Hymono 8803, 0.4% DATEM and the balance water. This led to a very thick product, with low fat spread like—consistency and -fatty impression.

Example I.5

A 40% fat dressing was prepared by low shear mixing of a commercial mayonnaise (80% fat) with the same amount of mesomorphic phase at room temperature. The following ingredients were used:

| | |
|---|---|
| gel phase | 50% |
| (7% Hymono 1103, 0.2% DATEM, water to 100%, | |
| trace CWS β-carotene) | |
| commercial mayonnaise (ex. Calve) | 50% |

The Calve product is a normal mayonnaise, available on the Dutch market. It is an O/W emulsion, containing 80% oil, with egg yolk as emulsifier. A very acceptable product with proper consistency (spoonable), fat impression and organoleptical properties was obtained.

Example I.6

A 10% fat dressing was made by dispering the 10% of oil in the water phase to obtain an 0/W emulsion, followed by mixing with the mesomorphic phase. The dressing was made using the following ingredients:

| | |
|---|---|
| gel phase | 32.7% |
| (10% Hymono 8803, 0.4% PA(*), balance water, | |
| trace CWS β-carotene) | |
| water phase (emulsion) | |
| water | 29% |
| sugar | 13% |
| salt | 1.2% |
| cider vinegar (5% acetic acid) | 12% |
| flavours | 1.5% |
| thickeners | 0.5% |
| (xanthan gum, propylene glyc. alg. LVF) | |
| potassium sorbate | 0.1% |
| sun flower seed oil | 10% |

PA is di-stearoyl phosphatidic acid (ex Sigma)

The water phase emulsion was prepared by dispersing the oil in the water phase by means of a high speed stirrer and homogenizer. The water phase emulsion was combined with the mesomorphic phase as indicated in example I.2. A product with proper consistency and organoleptical properties was obtained, with an oil phase containing a large amount of poly unsaturated fatty acids, with the usual health claims.

Example I.7

A 5% fat dressing was made by dispersing the oil in the gel phase, followed by mixing with the waterphase.

The dressing was made using the following ingredients:

| | |
|---|---|
| gel phase (with dispersed oil) | 33% |
| 8.5% Hymono 3203, 0.34% DATEM, balance water, | |
| CWS β-carotene{trace}, 15% Sunflowerseed oil) | |
| water phase | |
| water | 34.5% |
| sugar | 15% |
| salt | 1.4% |
| cider vinegar (5% acetic acid) | 14% |
| flavours | 1.5% |
| thickeners | 0.5% |
| (xanthan gum, propylene glyc. alg. LVF) | |
| potassium sorbate | 0.1% |

The gel phase with dispersed oil was prepared by mixing oil and gel phase from separate streams just after formation of the gel phase in a continuous processing line. The gel phase containing oil is combined with the water phase as indicated in example I.2.

A product with proper consistency and organoleptical properties was obtained. As in example I.6, the oil phase contains a large amount of poly unsaturated fatty acids.

Example I.8

A zero fat dressing was made by cold mixing the gel phase with the other components. First a gel phase was made according to the procedure described in example I.2 with the following composition: 10% Hymono 8803, 0.4% DATEM, trace CWS β-carotene, balance water. To this gel phase the other ingredients were added at room temperature by a house hold mixer at low speed. The other ingredients were (% on top of gel phase):

| wine vinegar (10% acetic acid) | 3% |
| sugar | 1% |
| mustard flour | 0.7% |
| curry powder | 0.3% |
| pepper | 0.3% |
| salt | 2% |

A product with a proper consistency and a distinct taste was obtained.

EXAMPLE II

Spreads

Example II.1

A mesomorphic phase was prepared as in example D. After neutralisation a process stream of the neutral blend was drawn from the vessel and fed into a single VOTATOR (RTM) "A-unit" operating at a shear (2000 rpm at lab scale). The jacket temperature of the A-unit was 5° C. and the outlet temperature of the process stream was 10° C. The product was packed into tubs and stored at 5° C.

On inspection the product had the appearance of an edible fatty spread both when static and when spread onto bread. There was no evidence of loose moisture in the product even after some storage. The organoleptic properties of the zero-fat products so obtained were described as "spreadlike", although the product comprised over 90% of water.

Example II.2

Example II.1 was repeated with the addition of 20%wt fat on the final product. The fat was introduced into the process stream prior to the "A-unit". A range of fat phases otherwise employed in edible spreads were used, as was pure sunflower oil. Product again were described as 'spreadlike' when sampled. A specific advantage of the use of sunflower oil is that the eventual product, while being spreadlike, contains very low levels of trans fats and relatively low levels of saturated fats.

Example II.3

A mesomorphic phase of the composition as indicated as in example B was prepared by mixing the ingredients together in a stirred water-jacketed vessel at 65° and the blend was neutralised with sodium hydroxide solution to pH 7.0. Separately a water-phase was prepared containing 0.6%wt of salt (sodium chloride) and 1% sodium caseinate at a pH of 4.5. A process stream of the neutral blend was drawn from the vessel and fed into a single VOTATOR (RTM) "A-unit" operating at a shear (2000 rpm at lab scale). The jacket temperature of the A-unit was 5° C. and the outlet temperature of the process stream was 10° C. The process stream was then blended with the water phase in a weight ratio of 5:1 of mesomorphic phase to water-phase and fed into a Votator (RTM) "C-unit" wherein the two streams were mixed. The eventual product emerging from the C-unit was packed in tubs and stored at 5° C.

On inspection the product again had the appearance of an edible fatty spread both when static and when spread onto bread. There was again non evidence of loose moisture in the product even after some storage. The organoleptic properties of the zero-fat product so obtained were again described as 'spreadlike'.

Example II.4

Example II.3 was repeated under identical conditions except that the mixing ratio of the water-phase to mesomorphic phase was 1:3 by weight. This produced an acceptable 0% fat spread with no loose moisture and good organoleptic properties.

Example II.5

The mesomorphic phase as produced in example B was hand-blended at ambient-temperature with commercially available chocolate spread in a weight ratio of 1:1. The resulting sweat-spread product was found to have acceptable organoleptic properties.

Example II.6

A mesomorphic phase was prepared as in example A. After heating and mixing the ingredients as described in example A, the mesomorphic phase was cooled using a scraped surface heat exchanger (Votator, A-unit) until a temperature of 12° C. The A-unit was operated at a throughput of 1 Kg/h and at high speed (2000 rpm). The products were packed in 250 g tubs and stored at 5° C.

The resulting product showed no loose moisture and could be spread easily on bread. Its organoleptic properties were very much like high- and reduced fat spreads, including a very distinct fatty impression. This product, however, contains only about 8% of the calories of a high fat spread (at equal volumes).

Example II.7

Example II.6 was repeated using the following composition:

| distilled water | 92.6% |
| monoglycerides (*) | 6% |
| sodium stearoyl lactylate (**) | 0.4% |
| Salt | 1% |
| Cold water soluble β-carotene and flavour | trace |
| Lactic acid | trace |

The processing as described in examples A and II.6 was used. This resulted in a zero fat spread with similar properties as the spread produced in example II.1 but for the fact that a distinct salty taste was obtained.

Example II.8

A zero fat spread was made using the following ingredients:

| | |
|---|---|
| Distilled water | 93.6% |
| Monoglycerides (Hymono 1103) | 6% |
| Co-surfactant (Admul SSL 2004) | 0.3% |
| Potassium sorbate | 0.1% |
| Cold water soluble (=CWS) β-carotene | trace |
| Flavour | trace |
| Lactic acid | trace |

The water was heated in a water-jacketed vessel until a temperature of 65° C. At that point all other ingredients were added to the water and the mixture was stirred gently, using a 'ribbon stirrer', for about 30 minutes. The pH of the resulting mesomorphic phase was set to a value of 4.6 using lactic acid.

Subsequently the mesomorphic phase was cooled using a scraped surface heat exchanger (Votator, A-unit) until a temperature of 12° C. The A-unit was operated at a throughput of 1 Kg/h and at high speed (2000 rpm). The products were packed in 250 g tubs and stored at 5° C. The resulting product showed no loose moisture and could be spread easily on bread. Its organoleptic properties were very much like high- and reduced fat spreads, including a very distinct fatty impression. This product, however, contains only about 8% of the calories of a high fat spread (at equal volume).

Example II.9

A zero fat spread was made containing salt by first preparing a spread as described in example II.8. To this spread 1 wt % of granular salt (NaCl) was added and mixed in by hand at 20° C., until homogeneously distributed. The physical and organoleptic properties of this spread were identical to the spread obtained in example II,8, but for the fact that a distinct salty impression was obtained upon eating the product. No grainy or sandy impression due to the granularity of the salt could be observed.

Example II.10

Example II.8 was repeated using the following composition:

| | |
|---|---|
| Distilled water | 92.6% |
| Monoglycerides (Hymono 3263) | 6% |
| Co-surfactant (Admul SSL 2004) | 0.4% |
| Salt | 1% |
| CWS β-carotene and flavour | trace |
| Lactic acid | trace |

The pH was set, using lactic acid, to a value of 4.2 No further changes to the processing as described in example II.8 were made. This resulted in a zero fat spread with similar properties as the spread produced in example II.8, but for the fact that a distinct salty taste was obtained.

Example II.11

A high PUFA (poly-unsaturated fatty acid) very low fat spread was prepared by first making a zero fat spread as described in example II.8. Subsequently, at 20° C., 6 wt % of sunflower oil was added to the spread and mixed until homogeneously distributed in the gel phase using an electric household mixer, operating at low speed.

The properties of the product were as described in example II.8, with an additional flavour sensation due to the sunflower oil present. This product can be marketed as a high PUFA spread in conjunction with the usual health claims for this type of products.

Example II.12

An all vegetable very low fat spread containing about 10% triglyceride materials was produced using the dual-line processing technique. In one water-jacketed vessel the following ingredients were mixed at 65° C.:

| | |
|---|---|
| Tap water | 95.1% |
| Monoglycerides (Hymono 8803) | 4% |
| Co-surfactant (Admul SSL 2012) | 0.3% |
| Salt | 0.5% |
| CWS β-carotene (ex Roch) | trace |
| Flavour | trace |
| Sodium sorbate | 0.1% |

In a second water-jacketed vessel a fat phase (Bean-oil blended with partly hydrogenated bean oil with a melting point of 36° C.) was heated to 45° C. Both, the water- and the fat phase were processed using separate Votator A-units. The water phase was processed under high shear conditions (2000 rpm) and cooled to a temperature of 12° C. The fat phase was processed under medium shear conditions (1000 rpm) and cooled to 20° C. The throughput of the water phase was 2.5 Kg/h and of the fat phase 0.3 Kg/h. After both A-units a single mixing unit (C-unit) was placed in which the water- and fat phase were homogeneously mixed under low shear conditions (250 rpm). The final product left the C-unit at a temperature of about 17° C. The product was subsequently packed in 250 ml tubs and stored at 5° C. The product thus obtained was stable, did not show loose moisture upon storage or spreading and had good organoleptic properties.

Example II.13

A bi-continuous very low fat spread containing 20% triglyceride materials was made using the following method: A gel phase was made using the method as described in example C, and of the following composition:

| | |
|---|---|
| Tap water | 92.4% |
| Monoglycerides (Hymono 8803) | 7% |
| Co-surfactant (Admul SSL 2003) | 0.5% |
| Na-benzoate | 0.1% |
| CWS β-carotene | trace |
| Flavour | trace |

This product was packed and stored at 5° C. for one day. A commercial low fat spread was bought on the Dutch market, i.c. Lätta. This is a fat continuous product which contains 40% fat. The dispersed water phase contains both gelatin and milk proteins as well as salt.

Both products were hand mixed at 20° C. and a weight ratio of 1:1 until a homogeneous product was obtained. Microscopical analysis of the product showed it to be bi-continuous in both the fat phase and mesomorphic phase. The product was physically stable, well spreadable and with organoleptic properties similar to the original low fat spread used.

Example II.14

A low fat spread, containing 40% triglyceride materials, was made in a way similar to the one described in example II.13. In this example the Dutch Latta was replaced by the commercially available (in Germany) high PUFA margarine Becel. This is a 80% triglyceride material, fat continuous product which contains no bio-polymers in the water phase. At least 60% of the fat phase consists of polyunsaturated fatty acids. The gel phase and margarine were mixed at a weight ratio of 1:1 using an electric hand-held household mixer, operating at low speed. During mixing the temperature was kept between 18 and 22° C.

The resulting product was fat continuous, as could be shown by light microscopy and electrical conductivity measurements. The product was physically stable and well spreadable. The organoleptic properties resembled those of spreads of a high polyunsaturated fat content. Similar results may be obtained by replacing German Becel by butter.

Example II.15

A zero fat spread containing gelatin was made using the following procedure. In a water-jacketed vessel the following ingredients were mixed at 65° C.:

| | |
|---|---|
| Tap water | 95.2% |
| Monoglycerides (Hymono 1103) | 3% |
| Co-surfactant (Admul SSL 2004) | 0.2% |
| Salt | 0.5% |
| Gelatin | 1.0% |
| Na-benzoate | 0.1% |
| CWS β-carotene, flavour | trace |

The pH was set to 5.0 using lactic acid. The mesomorphic phase thus obtained was processed using a Votator A-unit (1500 rpm, $T_{ex}$=12° C., 2.5 Kg/h) followed by a low speed C-unit (100 rpm). After packing the product was stored at 5° C. The product was stable and spreadable. The oral response was fatty, combined with quick oral break-down characteristics.

Example II.16

Example II.15 was repeated with the following ingredients:

| | |
|---|---|
| Tap water | 92.2% |
| Monoglycerides (Hymono 1103) | 5% |
| skimmed milk powder | 1% |
| Co-surfactant (Admul SSL 2004) | 0.2% |
| Salt | 0.5% |
| Gelatin | 1.0% |
| Na-benzoate | 0.1% |
| CWS- β-carotene, flavour | trace |

The final product differed from the one made by example II.15 that the appearance was more white and less translucent. The taste contribution of the milk proteins (and lactose) could clearly be observed in the final product.

Example II.17

A pasteurized zero fat spread of identical composition as example II.16 was made. This was done by first making a mesomorphic phase in which all ingredients are homogeneously mixed at 65° C. Then the emulsion is led through a tubular heat exchanger in which the mesomorphic phase is heated to 80° C. for a period of 45 seconds. Subsequently the emulsion is cooled down to 65° C. using a second tubular heat exchanger and processed using a Votator A-unit.

The product was packed under 'sterile' conditions using a lamellar flow cabinet and pre-sterilised tubs of 250 ml. Microbiological examination of the product one month after production did not show any micro-biological activity.

Example II.18

A split stream zero fat product containing bio-polymers was made using the following ingredients:

In one water-jacketed vessel the following ingredients were mixed:

| | |
|---|---|
| Tap water | 91.4% |
| Monoglycerides | |
| saturated (Hymono 8903) | 4% |
| unsaturated (Hymono 7804) | 3% |
| Co-surfactant (Admul SSL 2004) | 0.5% |
| Salt | 1% |
| Potassium sorbate | 0.1% |
| CWS β-carotene, flavour | trace |

In a second water-jacketed vessel the following ingredients were mixed:

| | |
|---|---|
| Tap water | 87% |
| Gelatin (acid, 250 bloom, ex PB) | 4% |
| Paselli-SA2 (ex AVEBE) | 8% |
| Salt | 1% |
| CWS β-carotene | trace |

Both water phases were first processed using a high shear Votator A-unit, after which the products were mixed in a subsequent C-unit (250 rpm, $T_{ex}$=15° C.). The final product consisted for 25% of the gel phase and for 75% of the bio-polymer phase.

The final product consisted of a continuous mesomorphic phase in which the bio-polymer phase was finely and homogeneously dispersed. The product was plastic and spreadable with good organoleptic properties.

Example II.19

A very low fat spread containing 20% triglyceride materials was made in-line using the dual-line method. In one part of the processing line, consisting a water-jacketed vessel and a Votator A-unit a mesomorphic phase is prepared as described in example II.8. In another part of the processing line a low fat spread is made using a water-jacketed vessel, two subsequent A-units and a final C-unit. The composition of this phase is as follows:

| | |
|---|---|
| Tap water | 55% |
| fat phase (a blend of bean oil, partially hardend bean-oil and partially hardened palm oil) | 40% |
| Gelatin (acid, pigskin, 200 bloom ex PB) | 3% |
| BMP (acid type buttermilk powder, ex. Frico) | 1% |
| Salt | 1% |
| β-carotene, flavour | trace |

After processing the mesomorphic phase in the A-unit (high shear) and the water/fat phase in the A-A-C-sequence, both products are mixed in at a weight ratio of 1:1 using a medium speed C-unit.

The resulting product was bi-continuous in mesomorphic and fat phase. Its physical and organoleptic properties were similar to that of a conventional low fat spread having a triglyceride content of about 40%.

Example II.20

A chocolate spread was prepared by low shear mixing of a commercial chocolate spread (32% fat) with the same amount of mesomorphic phase at room temperature.
Ingredients:
gel phase (10% Hymono 8803, 0.4% DATEM, balance water)
50%
chocolate spread. (ex. Albert Heyn, fat 32%, protein 3%, carbohydrate 62%)
50%
A product with proper consistency and acceptable organoleptic properties was obtained with a considerably lower calorie intake per serving.

Example II.21

A low fat chocolate spread was prepared using the following ingredients:

| | |
|---|---|
| water | balance |
| Hymono 8803 | 5% |
| Admul SSL 2004 | 0.25% |
| cocoa powder (ex. de Zaan, D 21A) | 5% |
| saccharose | 30% |
| skimmed milk powder | 10% |
| salt | 0.2% |
| potassium sorbate | 0.2% |
| vanillin | 0.02% |
| lactic acid | trace |

All ingredients were heated in a water-jacketed vessel to 65° C. under gentle stirring for about 30 min. The pH was set at a value of 5.0 using lactic acid. Subsequently the liquid mass was cooled using a scraped surface heat exchanger to a temperature of 12° C. with a throughput of 1 kg/h and a rotor speed of 1850 rpm.

A product was obtained with proper consistency and acceptable organoleptic properties without fat (triglyceride).

Example II.22

A low fat chocolate spread was prepared with the same composition as example II.21, apart from the non-ionic surfactant Hymono 8803, which was replaced by Phopholipon 100H (ex Natterman). A product was obtained with proper consistency and proper organoleptic properties.

III. WHIPPABLE PRODUCTS, SUCH AS CREAM

Example III.1

A low fat whippable non-dairy cream (NDC) was made by adding a mesomorphic gel phase to a non-whippable, low fat, non-dairy single cream. The gel phase consisted of:

| | |
|---|---|
| Tap water | 88% |
| Monoglycerides (Hymono 1103) | 12% |
| NaOH | trace |

The mesomorphic phase was made by mixing the water and the monoglycerides at 65° C. under low shear. The pH was set to 7.0 using NaOH. After a homogeneous lamellar phase was obtained the product was cooled down while continuously applying low shear, using a laboratory scale magnetic stirrer.

At a temperature of about 30° C. this phase was mixed with a commercial non-dairy cream available on the British market named 'Elmlea single cream'. This is a 18% fat cream which contains vegetable oils in the fat phase. The gel and cream phase were mixed at relative weight amounts of 40 and 60%. The mixture was subsequently whipped using an electric household mixer operated at maximum speed until an overrun of about 250% was obtained.

The resulting product was stable over a period of several days, had a distinct fatty oral impression and could be used in many applications where traditionally a high fat (about 45% fat) whipped cream is used, e.g. with coffee or for topping fruit salads. The present product however contains only about 50% of the calories of the high fat traditional product.

Example III.2

Example III.1 was repeated with the replacement of the single non-dairy cream by a dairy single cream available on the British marketed by St Ivel in the UK (9% fat). No adaptation in the processing was required and the final product obtained was visually and organoleptically virtually indistinguishable from the product obtained in example III.1.

Example III.3

Example III.1 was repeated with the use of pasteurised skim milk in stead of tap water to prepare the mesomorphic phase. This resulted in a final product which was slightly firmer and with improved organoleptical properties.

Example III.4

A whippable NDC was made by mixing the following ingredients at 65° C. until a homogeneous phase is obtained:

| | |
|---|---|
| single NDC | 40% |
| Water | 52.7% |
| Monoglycerides (Hymono 8803) | 7% |
| Co-surfactant (Admul DATEM 1935) | 0.3% |

The homogeneous mesomorphic phase was heated to 90° C. on an electric heating plate equipped with a magnetic stirrer. Immediately afterwards the mesomorphic phase was cooled to 40° C. Then the viscous emulsion was whipped using a Braun Multipractic electric food processor equipped with knifes.

The resulting product had an overrun of about 300% and showed a favourable consistency.

Example III.5

A zero fat whippable NDC was made by mixing the following ingredients at 65° C. until a homogeneous phase was obtained:

| | |
|---|---|
| Tap water | 85.5% |
| Buttermilk powder | 9% |
| Monoglyceride (Hymono 8903) | 5% |
| Co-surfactant (Admul SSL 2003) | 0.5% |

The mesomorphic phase was first thoroughly mixed using a laboratory scale Ultra Turrax (type TP 18/10, Janke & Kunkel GmbH, Staufen, Germany) operated at medium speed for 1 minute and subsequently cooled down slowly to 25° C. under continuous stirring, using a magnetic stirrer. The product was then placed at 5° C. The unwhipped product was a viscous, but still pourable liquid, the whipped product (using the device mentioned in example III.4) was firm, with a high overrun (about 300%) and had foam-like properties. In the whipped state the product was physically stable for a period of more than 3 days. The product had a distinct fatty impression.

Example III.6

Example III.5 was repeated while replacing Admul SSL 2003 by water. This resulted in a comparable product as obtained in example III.5, without the need to adapt the processing described.

Example III.7

In this example an extremely low fat whippable cream is made with the use of milk. The composition of the product is as follows:

| | |
|---|---|
| Tap water | 37.5% |
| Monoglycerides (Hymono 8803) | 5% |
| BMP | 7.5% |
| Semi-skimmed milk (pasteurised) | 50% |

The ingredients were all mixed until homogeneous in a water-jacketed vessel at 70° C. The thus obtained mesomorphic phase was then slowly cooled down under low shear conditions. The product was then stored at 5° C.

The unwhipped product was very cream-like in rheology, appearance and gave a distinct fatty impression. The product was also whipped using a Braun Multipractic electronic food processor equipped with knifes. The whipped product was firm and physically stable for a period of at least 1 week. The use of milk in the formulation improved the overall taste of the product in comparison with the products based on BMP only.

Example III.8

Example III.5 was repeated replacing the 9% BMP with 9% of a mix of 50% BPM and 50% SMP, the obtained product had a more balanced taste profile than the product obtained in example III.5. All other product properties were similar.

The product was also whipped after the addition of 10% by weight of the cream (granulated) sugar to the finished, unwhipped product. Apart from the more sweet taste, the physical and sensorial properties of the whipped products remained similar.

Example III.9

Example III.5 was repeated with the addition of 2% gelatin to the formulation (200 bloom, acid type, pig skin ex PB Gelatin, Belgium) and reducing the water content by 2%. The obtained unwhipped product had a weak gel-like rheology and was not readily pourable. The whipped product was more firm than the product obtained in example III.5. The product could be whipped to any overrun between 200 and 500%, changing in properties from whipped cream-like to foam-like.

Example III.10

Example III.5 was repeated adding 0.2% Guar gum (ex Meyhall Chemical AG, Kreuzlingen, Switzerland) to the formulation, while reducing the water content by 0.2%. This product showed an improved oral destabilisation and flavour release. The unwhipped product was slightly more viscous.

Example III.11

Example III.5 was repeated with a small change in the processing of the product. After preparing the mesomorphic phase at 65° C. The phase was shortly heated to 85° C. and then cooled down to 65° C. before continuing with the normal Ultra Turrax mixing. The product that was obtained showed a higher viscosity in the unwhipped state. The physical properties of the whipped product remained similar.

Example III.12

A zero fat NDC was made by mixing the following ingredients in a water-jacketed vessel at 65° C.:

| | |
|---|---|
| Skim milk (pasteurised) | 89% |
| Monoglycerides | |
| saturated (Hymono 8803) | 4% |
| unsaturated (Hymono 7803) | 2% |
| BMP | 4% |
| Skimmed milk powder | 2% |
| CWS β-carotene | trace |

The mesomorphic phase was stirred vigorously for 1 minute using an Ultra Turrax and then cooled to 5° C. under low shear conditions. The unwhipped product was viscous and gave a fatty oral impression, very much like available commercial products. The whipped product was physically stable at room temperature and showed a favourable destabilisation under oral conditions.

Example III.13

Example III.12 was repeated with a change in the formulation. The unsaturated monoglycerides were replaced by an equal amount of phospolipids (Admul 2879). The resulting unwhipped product was reduced in viscosity and readily pourable. The whipped product was firm. Upon storage the foam showed a slight coarsening of the air-bubbles, much like the coarsening which can be observed after storing a whipped dairy cream. At the same time the whipped product became even more firm. The oral dispensability of the product was very good.

Example III.14

A Bavarois was made using the following ingredients:

| | |
|---|---|
| water | balance |
| monoglycerides (Hymono 8803 ex. Quest Int.) | 1% |
| Admul SSL 2004 (ex. Quest Int.) | 0.04% |
| gelatin | 1% |
| sugar | 11% |
| fruit juice and fruit (strawberries) | 40% |
| whipped dairy cream | 35% |

The gelatin was presoaked in water during 10 minutes. Sugar, fruit juice and fruit were heated till about 70° C. The gelatine, freed from water, was added. The liquid was cooled under stirring till a thin viscous mass is obtained.

A foam was prepared by mixing water, monoglycerides and Admul SSL at 65° C., and cooling under stirring with a mixer, to incorporate air. An overrun of about 400% was obtained. Subsequently, the mesomorphic phase foam and the stiff whipped dairy cream were gently mixed with the fruit mass to obtain, after refrigeration, a stiff bavarois type of product. This product was comparable in stability, fatty impression and organoleptical properties with a classically prepared bavarois, made with egg white.

Example III.15

By leaving out the dairy cream a low calorie bavarois was prepared of the following composition:

| | |
|---|---|
| water | 36% |
| monoglycerides (Hymono 8803 ex. Quest Int.) | 3% |
| Admul SSL 2004 (ex. Quest Int.) | 0.12% |
| gelatin | 1% |
| sugar | 12% |
| fruit juice and fruit (strawberries) | balance |

The product was prepared as indicated in example III.15, with the exception that the obtained foam was directly mixed with the fruit mass. It had the proper consistency, stability and acceptable organoleptic properties.

Example III.16

A chocomousse dessert was prepared using the following ingredients:

| | |
|---|---|
| water | 36% |
| monoglycerides (Hymono 8903 ex. Quest Int) | 2.5% |
| Admul SSL 2003 (ex. Quest Int.) | 0.1% |
| chocolate | 37% |
| water | balance |
| sugar | 17% |

Chocolate; water and sugar were mixed under heating and stirring till a homogeneous mass was obtained. The chocolate mass is cooled to room temperature.

A foam was prepared by mixing water, monoglycerides and Admul SSL at 65° C., and cooling under stirring with a hand held electric household mixer at maximum speed, to incorporate air. An overrun of about 400% was obtained. The foam was further stiffened by storage in a refrigerator at 5° C. Subsequently the chocolate mass and the foam were mixed by means of a mixer to obtain a chocolate mousse.

The product had an excellent consistency and proper organoleptical properties.

EXAMPLE IV

Frozen Desserts

Example IV.1

A mixture A was prepared of

| | |
|---|---|
| 6.7% | MD 20 (maltodextrin) |
| 0.2% | guar gum |
| 0.1% | LBG |
| 6.6% | msnf |
| 1.7% | whey powder |
| 11.6% | sucrose |
| 71.5% | water | while stirring the mixture was heated to 90–95° C. and at this temperature a molten mixture B of 1.% glyceryl monostearate (Admul 4103, trade mark of Quest International) and 0.5% sodium stearoyl lactylate (Admul SSL 2003, trade mark of Quest International) was added.

Thereafter the combined mixture was cooled down to 5° C., homogenized using a single stage Rannie homogeniser at a pressure of 150–180.10$^5$Pa, 0.05% vanilla flavour was added and the mixture was allowed to age for 24 hours. Thereafter the mixture was whipped to 100% overrun while cooling in a usual continuous ice cream freezer (Hoyer MF50) to –5° C. The resulting creamy frozen dessert could be eaten as such or be stored after cooling down to usual storage temperatures, e.g. about –25° C. Using DSC (differential scanning calorimetry) the gel phase could be ascertained in the frozen product.

Examples IV.2 to IV.6

The procedure of Example IV.1 was repeated using the following recipes:

| | EXAMPLE | | | | |
|---|---|---|---|---|---|
| | 2 | 3 | 4 | 5 | 6 |
| Mixture A: | | | | | |
| MD 20 | 6.7 | 6.7 | 7.0 | 6.7 | 6.7 |
| Guar gum | 0.2 | 0.2 | 0.2 | 0.2 | 0.2 |
| LBG | 0.1 | 0.1 | 0.1 | 0.1 | 0.1 |
| msnf | 6.6 | 6.6 | 8.0 | 6.6 | 6.6 |
| whey powder | 1.7 | 1.7 | — | 1.7 | 1.7 |
| sucrose | 11.6 | 11.6 | 10.0 | 11.6 | 11.6 |
| water | 71.9 | 71.9 | 72.6 | 71.6 | 71.6 |
| Mixture B: | | | | | |
| Hymono 1103 | | | | 1.0 | |
| Admul 4103 | 1.0 | | | | |
| Hymono 8903 | | 1.0 | 1.0 | | 1.0 |
| Admul SSL 2003 | 0.1 | 0.1 | 0.1 | | |
| Admul Datem 1935 | | | 0.1 | 0.1 | |
| Vanilla flavour | 0.05 | 0.05 | 1.0 | 0.4 | 0.4 |

The resulting frozen deserts products had an ice-cream like taste and also eating properties very much like ice cream having a usual fat content.

Furthermore the melt-down properties were not too different from usual ice cream, but markedly better than usual fat-free or low fat frozen desserts.

Example IV.7

Example IV.1 was repeated except that the mixture was heated to 70–75° prior to addition of B. Thereafter the mixture was heated to 90–95° for 3–5 mixture followed by homogenisation using a single stage Rannie homogeniser at a pressure of 150–180.10$^5$ Pa and cooled down to 5° C. After this a vanilla flavour was added and the process was continued as in example IV.1. An ice-cream product of good quality was thus obtained.

EXAMPLE V

Cheese

Example V.1

A semi-soft, low fat, Gouda type cheese was prepared from a cheese milk comprising 95.5% pasteurized low fat milk (0.5% fat, 3.5% protein) and 4.5% mesomorphic phase. The mesomorphic phase was made by mixing pasteurized skimmed milk with 6% monoglycerides (Hymono 8803) at 65° C. and subsequently cooling the mesomorphic phase using a votator A-unit operated at medium speed (1000 rpm). The mesomorphic phase thus obtained was dispersed in the milk using a hand held electric stirrer.

To 300 liters of this cheese milk the following composition was added:

| | |
|---|---|
| 57 g | CaCl$_2$ |
| 45 g | KNO3 |
| 10 ml | single strength annatto colour |
| 2.1 l | 'BOS'culture |
| 90 ml | calf rennet |

After 45 minutes clotting at 29° C. The curd was cut to cubes of approx. 4 mm and after 1 minute sedimentation 150 l whey was removed. Washing water (114 l, 29° C.) was added and after 28 minutes holding time the curd was pressed into forms. After removal of the whey the (5 kg) cheese blocks were pressed for 3 hours at 1 bar. Brining was carried out in 18 Baume brine for 18 hours. The final pH of the unripened cheese was 5.2 After riping the resulting low fat cheese (10% fat on dry matter) had excellent consistency, texture and taste.

Example V.2

A low fat imitation Mozzarella was prepared from the following ingredients:

| | |
|---|---|
| 20% | mesomorphic phase |
| 26% | Ca-caseinate |
| 10% | Palm oil |
| 4.3% | Na-caseinate |
| 1% | Tricalcium phosphate |
| 0.6% | Lactic acid |
| 0.1% | Sorbic acid |
| 0.2% | flavour |
| balance | water |

The mesomorphic phase used was identical to the one used in example 1. All ingredients were mixed in a Stephan Mixer at high speed during heating to 80° C. After evacuation at 0.25 bar for 1 minute, the product had good body and taste comparable to a 20% fat imitation Mozzarella reference.

Processed Cheese

Mesomorphic phases were used in the preparation of pasteurized low-fat processed cheeses at a level of between 5 and 40% gel phase (0.5 to 5% monoglyceride on product). The products were made with—as well as without melting salts (phosphates). Conventional production processes and production equipment were used for the preparation of processed cheeses.

The consistency of the product became more creamy at all levels of mesomorphic phase present. Compared with a processed cheese without mesomorphic phases, but of the same total fat level (butterfat), the products of the invention resembled high-fat processed cheeses in consistency and appearance, whereas taste was less influenced. More details are given in the following examples.

Example V.3

A low-fat processed cheese with 20% mesomorphic phase was prepared according to the following formulation:

40.0% Gouda cheese (20% on dry matter)
6.0% Gouda cheese (48% on dry matter)
20.0% Mesomorphic phase
6.0% sweet whey powder
2.0% skimmed milk powder
2.1% melting salts
Water up to 100%

The mesomorphic phase consisted of 10% monoglycerides (Hymono 8803), 0.5% Admul SSL 2003 and 89.5% pasteurized skimmed milk. The mesomorphic phase was made one day in advance of the processed cheese preparation. The phase was made by adding the monoglycerides, co-surfactant and milk together at 65° C. and stir for about 60 min. Then this mesomorphic phase was processed using a votator A-unit, operated at medium speed. The resulting product had a white appearance and a spread-like consistancy. The next day all ingredients were mixed in the melting vessel at 20° C. Subsequently the vessel was heated to 90° C. for 5 minutes, by this way effectively pasteurising the product. The product was then packed and stored at 5° C.

The product obtained had a dry matter content of 41%, a butterfat content of 6% and contained 2% monoglyceride. The processed cheese had a firmness at 20° C. of 220 g (using the Stevens Texture Analyzer). Its consistency was judged as smooth, well spreadable and not rubbery. The taste was not significantly different from that of the processed cheese without mesomorphic phases. Product properties slightly improved upon aging until at least 10 weeks.

Example V.4

Example V.3 was repeated with the addition of 2% monoglycerides (Hymono 8803) in stead of 20% ready made mesomorphic phase. To obtain a final composition which was identical to the composition of the product made in example V.3 the skimmed milk powder addition was increased to 3.8%, the moisture level was adapted to make up to 100%. No co-surfactants were added.

The processed cheese obtained in this way showed the same properties as that from example V.3.

Investigation of its structure, using DSC and X-ray diffraction, revealed, that during processing the mesomorphic phase was formed in the product.

Example V.5

A processed cheese without melting salts was prepared from the following mixture:

40.0% Gouda cheese 20%
6.0% Gouda cheese 48%
15.0% fat-free quark
4.5% sweet whey powder
4.0% whey powder concentrate
water to 100%

The processing was as described in example V.3.

Dry matter content of this cheese was 40%, its butterfat level 6% and its firmness at 20° C. ca. 200 g.

The cheese was homogeneous without whey separation. Consistency was smooth and creamy. The processed cheese was well spreadable and with an acceptable mouthfeel. The taste was more natural, it lacked the typical "chemical" note of a processed cheese made with phosphates.

EXAMPLE VI

Other Food Products

Example VI.1

A sauce Hollandaise was prepared. The commercial equivalent is a very high fat product (ex. Lipton,57% fat). The ingredients were:

| | |
|---|---|
| water | balance |
| Hymono 8803 | 9% |
| Admul SSL 2004 | 1% |
| 0.2% watersoluble β-carotene | 0.6% |
| sugar | 0.5% |
| salt | 0.09% |
| onion powder | 0.33% |
| divers flavours | 0.2% |

All ingredients were heated to 65° C. in a water-jacketed vessel under gentle stirring and kept at that temperature for about 30 min. The pH was set at a value of 4.0 with lactic acid. Subsequently the liquid mass was cooled using a heat exchanger to a temperature of 20° C., with a throughput of 5 kg/h with minimal shear. The consistency, appearance and taste were comparable to commercial available sauces of this type. The product is heat stable up to a temperature of 70° C.

Example VI.2

A product with the same composition as example VI.1 was prepared apart from the Hymono 8803, which was replaced by phospholipon 100H (ex Natterman). Also this product had a consistency, appearance and taste comparable to the commercial equivalent. The product was however heat stable up to a temperature of at least 90° C.

Example VI.2

In this example the preparation of a extremely low fat chocolate sauce is described using a phospholipid as the source of the mesomorphic phase.

| | |
|---|---|
| water | balance |
| phopholipon 100H (ex. Natterman) | 3% |
| DATEM (Admul 1935) | 0.2% |
| sugar | 27% |
| cocoa powder (ex. de Zaan, D 21A) | 19% |
| K-sorbaat | 0.2% |

All ingredients were heated to 65° C. in a water-jacketed vessel under gentle stirring and kept at that temperature for about 20 min. The pH was set at a value of 5.0 using lactic acid. Subsequently the liquid mass was cooled using a scraped surface heat exchanger to a temperature of 12° C., with a throughput of 1 kg/h and a rotor speed of 1850 rpm. The product had a viscous sauce like consistency and proper organoleptic properties.

Example VI.3

A zero fat milk was prepared using the following ingredients:

| | |
|---|---|
| Skimmed milk (pasteurised) | balance |
| Water | 3.28% |
| Monoglycerides | 0.21% |
| Co-surfactant (Admul SSL 2012) | 0.01% |
| NaOH | trace |

In a water jacketed vessel the water, monoglycerides and co-surfactant were mixed at 65° C. The pH was set to 6.7 using NaOH. After a homogeneous phase was obtained the mesomorphic phase was cooled down using a scraped surface heat exchanger (Votator A-unit) operated at medium speed (900 rpm). The product which was thus obtained was a rather soft gel. Subsequently the gel phase was added to the milk phase at 10° C. Using a hand held electric household mixer the gel phase was finely dispersed into the milk phase. Care has to be taken not to aerate the milk in this process. The final product has a non-watery, creamy and full mouthfeel, resembling full fat milk. The dispersed gel phase did not cream upon storage during a period of three days. This product has about the same calorie intake as skimmed milk and about half of the calories of full fat milk.

Example VI.4

Example VI.3 was repeated using reconstituted skimmed milk in stead of pasteurised skimmed milk. The reconstituted skimmed milk was prepared by slowly mixing 100 g SMP (skimmed milk powder, ex DOMO, Beilen, The Netherlands) with 900 g water in a water-jacketed vessel at 35° C. Special care was taken not to incorporate air into the prepared milk. The product obtained using the reconstituted milk was similar to the product described in example VI.3.

Example VI.5

A liquid coffee creamer was prepared by using the following ingredients:

| | |
|---|---|
| Skim milk (pasteurised) | balance |
| SMP | 4% |
| Water | 7% |
| Monoglycerides (Hymono 8903) | 0.4% |
| Co-surfactant (Admul DATEM 1935) | 0.02% |

The preparation of the coffee creamer was the same as described in example VI.3. First the Skim milk and SPM were mixed at 35° C. Then, in a water-jacketed vessel, the lamellar phase was made by mixing the water, monoglycerides and co-surfactant together. The pH was set at 6.0 using NaOH. The gel phase was subsequently prepared using an A-unit. Finally, the gel phase and milk phase were mixed at 15° C. using a hand held kitchen mixer. The final product consisted of a continuous aqueous phase in which a gel phase was finely dispersed.

The product performed well as a coffee creamer, giving a good white colour when added to coffee and hardly any fat on top of the hot liquid.

Example VI.6

A creamy low fat chocolate milk was prepared using the process as described in example VI.3. To the ingredient list 2% cocoa and 5% sugar was added. These ingredients were added to the milk phase just after mixing the gel- and water phase. The milk phase, cocoa and sugar are mixed together until homogeneous. The final product was physically stable and had a creamy and rich taste.

Example VI.7

An imitation full fat yoghurt was prepared using a zero fat milk similar to the one described in example VI.3. The only difference was that the pasteurised milk of example VI.3 was replaced by a heat treated (90° C. for 10 min.) skim milk. To this milk a culture consisting of *Streptococus thermophilus* and *Lactobacillus bulgaricus* was added (ex. Hanson, Denmark). The mixture was left at 45° C. during 5 hours until a pH of 4.6 was obtained. The product was then stored at 5° C. The product showed a favourable consistency combined with a full and creamy mouthfeel.

Example VI.8

A fresh cheese (or quark) was prepared using the zero fat milk as described in example VI.3. To this milk phase a starter culture (1.5% on milk phase) and rennet (also 1.5% on milk phase) were added and mixed in. This was left without shear during 17 hours until a pH value of 4.7 was reached. The fresh cheese was obtained by subsequent centrifugation in a traditional quark centrifuge (Westphalia KDA20, Oelde, Germany).

The product was characterised by a smooth, non-sticky, creamy and non-chalky mouthfeel.

What is claimed is:

1. Finished foodstuff, cake batters not constituting finished foodstuffs, comprising bulk regions of a mesomorphic phase of edible surfactant which structures the finished foodstuff and less than 80% wt. edible oil, said surfactant being selected from the group consisting of edible monoglycerides, diglycerides, non-ionic phospholipids, non-fatty carboxylic acid esters of fatty acid esters, partial sugar-fatty acid esters, partial fatty acid esters of polyols, cationic surfactants, anionic surfactants and mixtures there, said finished foodstuff being selected from the group consisting of dressings, mayonnaise, spreads, whippable products, frozen desserts, cheese, sauces, liquid dairy products, dairy and non-dairy creams and toppings, said mesomorphic phase being a continuous phase or comprising 80 wt. % or more of water.

2. Finished foodstuff according to claim 1, comprising at least 5% by volume of mesomorphic phase.

3. Finished foodstuff according to claims 1, comprising from 0.1 to 30 wt % of edible surfactant.

4. Finished foodstuff according to claim 1, comprising a from 0.1 to 30% of biopolymers.

5. Finished foodstuff according claim 1, wherein the edible surfactant comprises a partial glyceride, preferably monoglyceride.

6. Finished foodstuff according to claim 1, comprising from 1 to 30% by weight of edible nonionic surfactants and from 0.005 to 10% by weight of edible ionic surfactant.

7. Finished foodstuff according to claim 1 being a product selected from the group of dressings, mayonnaise, spreads, whippable products, frozen desserts, cheese, sauces and liquid dairy products.

8. The finished foodstuff of claim 7 wherein the product is ice cream.

9. The finished foodstuff of claim 1 wherein the mesomorphio phase comprises 10% or less of ionic surfactant.

10. The finished foodstuff of claim 9 wherein the mesomorphic phase comprises 0.005% to 10% ionic surfactant.

11. The finished foodstuff of claim 1 wherein the finished foodstuff comprises from 0% to 40% fat.

12. The foodstuff of claim 11 wherein the foodstuff is a spread and the level of triglycerides is from 0 to 30 wt %. spread.

13. The finished foodstuff of claim 1 wherein the mesomorphic phase comprises from 1% to 12% nonionic surfacant and up to 10 wt. % ionic surfactant.

14. The finished foodstuff of claim 1 wherein the cationic surfactants are selected from the group consisting of cationic phospholipids, cationic non-fatty carboxylic acid esters of fatty acid esters and mixtures thereof.

15. The finished foodstuff of claim 1 wherein the anionic surfactants are selected from the group consisting of lactylated fatty acid salts, anionic phospholipids, anionic nonfatty carboxylic acid esters of fatty acid esters and their metal salts, fatty acids and their metal salts and mixtures thereof.

16. The finished foodstuff of claim 1 wherein the total level of edible surfactant in the foodstuff is from 2 to 30 wt. %.

17. The finished foodstuff of claim 1 wherein the mesomorphic phase comprises 80% or more of water.

18. The finished foodstuff of claim 1 wherein the foodstuff is selected from the group consisting of dressings, mayonnaise, spreads, sauces, liquid dairy products, dairy and nondairy creams and toppings.

19. The finished foodstuff according to claim 18 wherein the finished foodstuff is selected from the group consisting of dressings, mayonniase, spreads and sauces.

20. The finished foodstuff according to claim 1 wherein the surfactant is selected from the group consisting of edible monoglycerides, diglycerides, nonionic phosopholipids, non-fatty carboxylic acid esters of fatty acid esters, partial sugar fatty acid esters, cationic surfactants, anionic surfactants and mixtures thereof.

21. The finished foodstuff according to claim 1 wherein the mesomorphic phase is a continuous phase.

22. The finished foodstuff according to claim 1 wherein the surfactant is selected from the group consisting of edible monoglycerides, diglycerides, non-ionic phospholipids, cationic surfactants, anionic surfactants and mixtures thereof.

23. The finished foodstuff according to claim 22 wherein the surfactant includes monoglycerides.

24. The finished foodstuff according to claim 22 wherein the finished foodstuff is selected from the group consisting of dressings, mayonnaise, spreads, cheese, sauces, liquid dairy products, dairy and non-dairy creams and toppings.

25. The finished foodstuff according to claim 24 wherein the finished foodstuff is selected from the group consisting of dressings, mayonnaise, spreads, cheese, sauces, and toppings.

26. The finished foodstuff according to claim 25 the finished foodstuff is selected from the group consisting of dressings, mayonnaise, spreads, cheese and sauces.

27. The finished foodstuff according to claim 22 wherein the finished foodstuff is a whippable product selected from the group consisting of whippable non-dairy creams, mousses, bavarois and whippable dairy creams.

28. The finished foodstuff according to claim 1 wherein the surfactant is a non-fatty carboxylic acid ester of fatty acid esters.

29. The finished foodstuff according to claim 28 wherein the finished foodstuff is selected from the group consisting of dressings, mayonnaise, spreads, cheese, sauces, liquid dairy products, dairy and non-dairy creams and toppings.

30. The finished foodstuff according to claim 28 wherein the finished foodstuff is a whippable product selected from the group consisting of whippable non-dairy creams, mousses, bavarois and whippable dairy creams.

* * * * *